(12) United States Patent
Kunkler

(10) Patent No.: US 6,792,965 B2
(45) Date of Patent: Sep. 21, 2004

(54) SHUTTLE VALVE ASSEMBLY

(75) Inventor: Scott Carl Kunkler, Yakima, WA (US)

(73) Assignee: Smiths Aerospace Actuation Systems-Yakima, Inc., Yakima, WA (US)

(*) Notice: Subject to any disclaimer, the term of this patent is extended or adjusted under 35 U.S.C. 154(b) by 194 days.

(21) Appl. No.: 09/955,757

(22) Filed: Sep. 20, 2001

(65) Prior Publication Data

US 2004/0050416 A1 Mar. 18, 2004

(51) Int. Cl.[7] .................. F16K 31/122; F16K 11/00
(52) U.S. Cl. .............. 137/113; 137/100; 137/625.69; 251/297
(58) Field of Search .................. 137/100, 112, 137/113, 625.69; 251/297

(56) References Cited

U.S. PATENT DOCUMENTS

| | | |
|---|---|---|
| 1,469,854 A | 10/1923 | Stuart |
| 1,919,430 A | 7/1933 | Hewitt |
| 2,354,791 A | 8/1944 | Boldt |
| 2,358,228 A * | 9/1944 | Hoof .......................... 137/113 |
| 2,366,608 A | 1/1945 | Freeman |
| 2,440,478 A * | 4/1948 | Kehle .......................... 137/113 |
| 2,729,226 A * | 1/1956 | Jones .......................... 137/112 |
| 3,043,325 A | 7/1962 | Slawson |
| 3,155,105 A | 11/1964 | Yanna |
| 3,533,431 A * | 10/1970 | Kuenzel et al. ............. 137/113 |
| 3,642,020 A | 2/1972 | Payne |
| 3,687,153 A | 8/1972 | Gold |
| 4,187,871 A * | 2/1980 | Hendrickson ............... 137/112 |
| 4,281,677 A * | 8/1981 | Hoffman ..................... 137/113 |
| 5,127,426 A * | 7/1992 | D'Archambaud ........... 137/113 |
| 6,196,252 B1 | 3/2001 | Martin et al. |
| 6,296,008 B1 * | 10/2001 | Boyer et al. ................ 137/113 |

* cited by examiner

Primary Examiner—Ramesh Krishnamurthy

(57) ABSTRACT

A shuttle valve assembly, comprising a valve housing containing first, second and third ports, and a cavity in the housing, a poppet shiftable in the cavity between a first position and a second position, the poppet in its first position directing flow between the first port and the second port, communication between the second port and third port then being blocked, the poppet in its second position directing flow between the third port and the second port, communication between the second port and first port then being blocked, and a friction responsive holder acting to hold the poppet in its first position until fluid pressure shifts the poppet to its second position, and to hold the poppet in its second position until fluid pressure shifts the poppet to its first position.

10 Claims, 6 Drawing Sheets

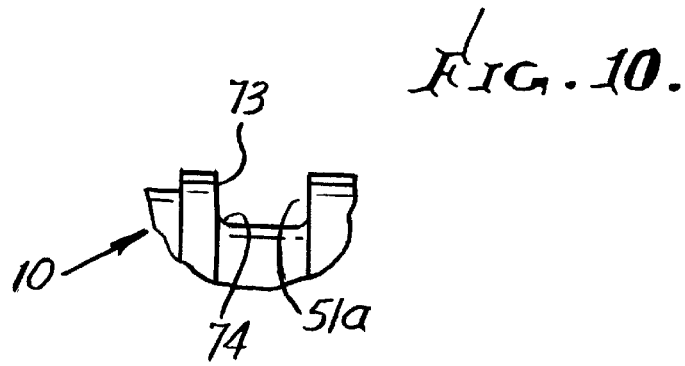
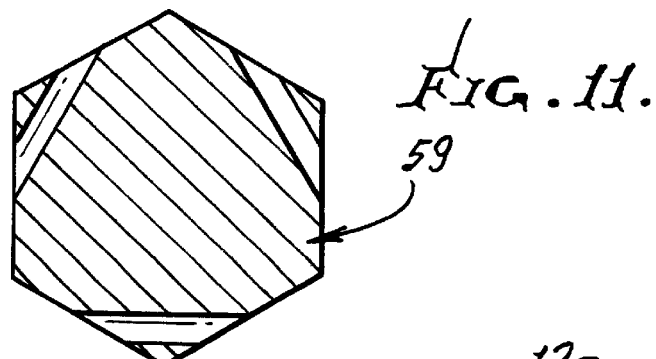
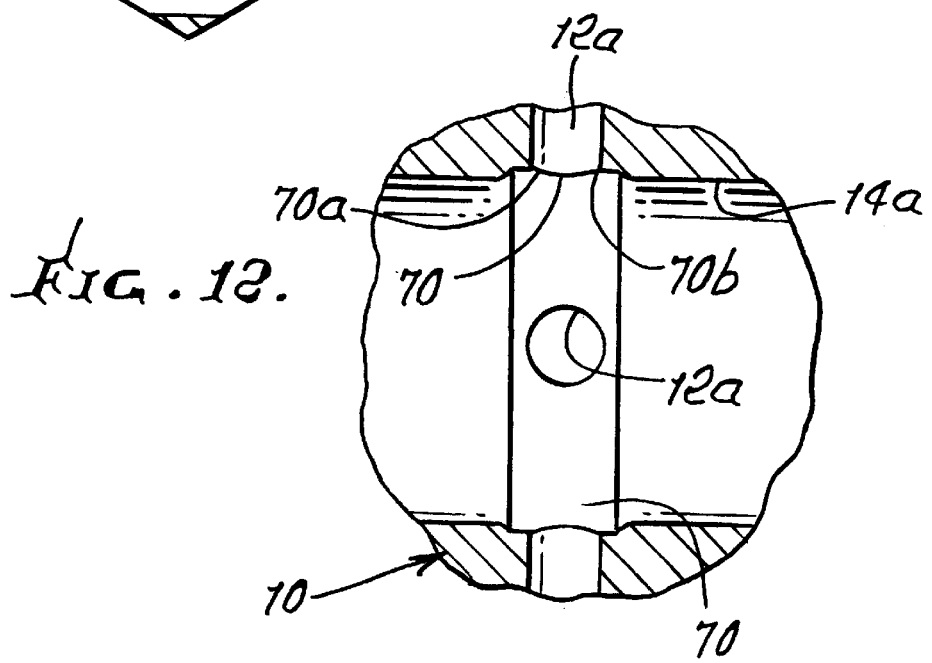

SHUTTLE VALVE ASSEMBLY

BACKGROUND OF THE INVENTION

This invention relates generally to poppet valves, and more particularly to improvements in the construction and operation of such valves, in which a shuttle type poppet shifts between alternate positions.

The shuttle or poppet of such a valve is required to shift position, to control fluid flow, in response to applied fluid pressure. The poppet must then be held in its alternate position in order not to inadvertently shift position during fluid flow. The use of detents to hold the shuttle in position introduces undesirable complexity to the valve, the construction of which must be simple and reliable. Accordingly, there is a need for simple, effective poppet type shuttle valves of improved construction, avoiding the use of shuttle holding detents.

SUMMARY OF THE INVENTION

It is a major object of the invention to provide an improved poppet type shuttle valve meeting the above need.

Basically, the improved shuttle valve assembly of the present invention comprises:

a) a valve housing containing first, second and third ports, and a cavity in the housing, b) a poppet shiftable in the cavity between a first position and a second position, c) the poppet in its first position directing flow between the first port and the second port, communication between the second port and third port then being blocked, d) the poppet in its second position directing flow between the third port and the second port, communication between the second port and first port then being blocked, e) and a friction responsive holder acting to hold the poppet in its first position until fluid pressure shifts the poppet to second position, and to hold the poppet in its second position until fluid pressure shifts the poppet to the first position.

As will appear, the holder may typically be carried by the poppet in a position to frictionally engage a surface to resist poppet shifting, until fluid pressure creates force that overcomes the frictional engagement of the holder and surface.

It is another object of the invention to provide the holder in the form of an elastomeric O-ring that extends about an axis defined by the poppet, that axis extending in the direction of poppet shifting.

It is a further object of the invention to locate the O-ring out of the direct flow paths of pressurized fluid in each of the first and second poppet positions.

Yet another object is to provide a body having a bore into which the housing is endwise received, the body having first, second and third passages in registration with the first, second and third ports, respectfully. As will be seen, such passages may typically intersect the body bore, sidewardly of the poppet.

A further object is to provide spaced piston surfaces on the poppet for receiving fluid pressure acting to shift the poppet between said positions, the O-ring located between said piston surfaces.

A yet further object is to provide the second port to have two sections which are longitudinally spaced apart and which intersect a bore defined by the housing at intersection locations, said friction responsive holder remaining between said intersection locations at all times during shifting of the poppet between its first and second positions, and the second port having an additional section which is longitudinally elongated, radially outwardly of the holder, and which intersects radially outward extents of said two sections of the second port.

An additional and important object is to provide a simple, rugged, reliable shuttle valve assembly that comprises fewer than 10 parts, as for example is shown in the drawings.

These and other objects and advantages of the invention, as well as the details of an illustrative embodiment, will be more fully understood from the following specification and drawings, in which:

DRAWING DESCRIPTION

FIG. 10 is an enlarged fragmentary section taken on line 10–10 of FIG. 4;

FIG. 11 is an enlarged section taken on lines 11–11 of FIG. 4; and

FIG. 12 is an enlarged view on lines 12–12 of the indicated portion of FIG. 5;

DETAILED DESCRIPTION

Figure 1:
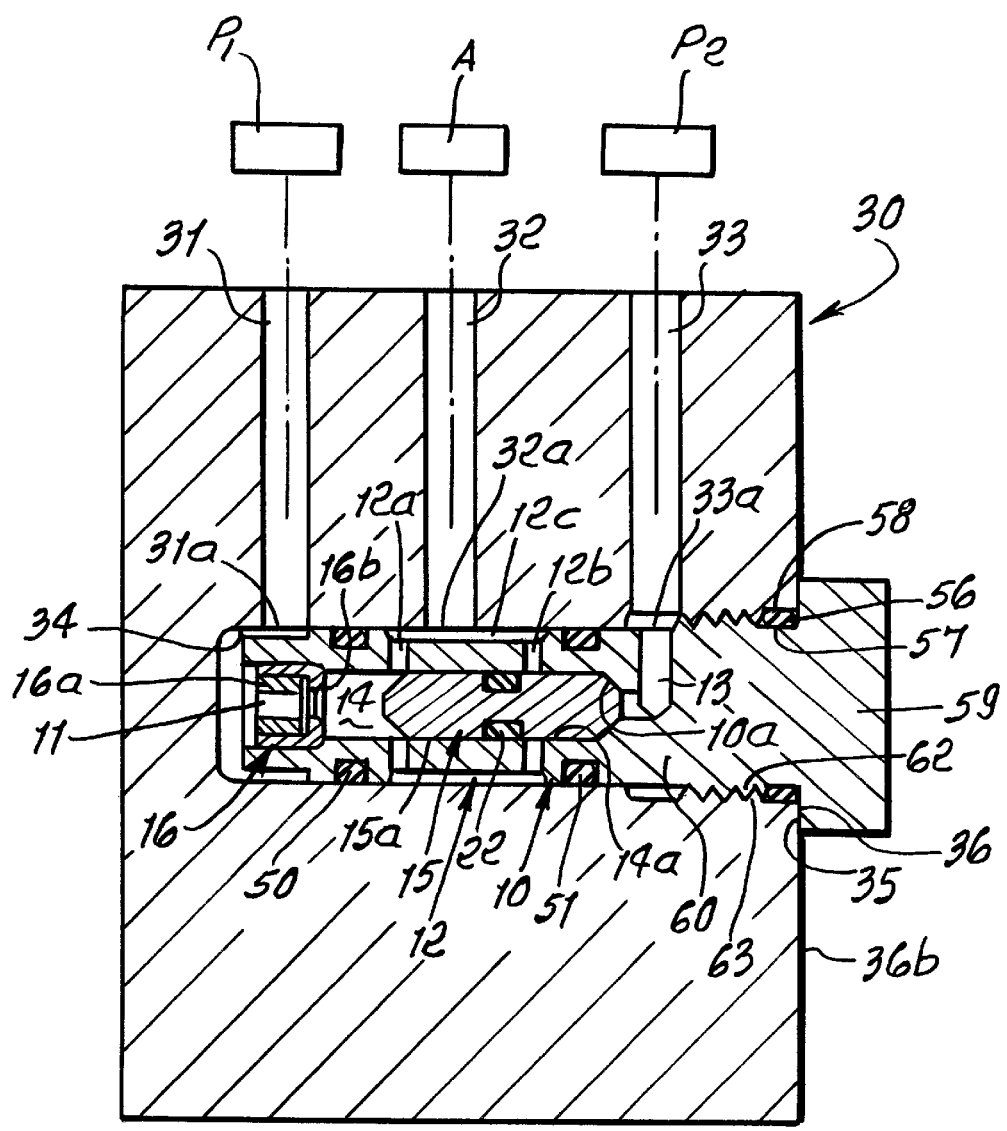
FIG. 1 is a vertical section taken through a preferred form of apparatus embodying the invention, and showing the poppet in a rightward position.

In the drawings, a valve housing 10 contains first, second and third ports 11, 12 and 13, which are located in a cavity 14 in the housing second port 12 includes axially spaced sections 12a and 12b and an elongated, linking peripheral section 12c. A poppet or shuttle 15 is shiftable in the cavity between a first position, seen in FIG. 1, and a second position, seen in FIG. 1a. In groove 51a in FIG. 10, and the fillet at 74 at the base of wall 73, in FIG. 10. A similar arcuate recess 70' intersects port section or sections 12b.

Since the assembly incorporates only a few parts, i.e. typically less than ten, the shuttle shank may be simply and easily installed in bore 14a, plug 16 may be inserted in counter bore 18 to seat at 81, and the housing 10 may be installed endwise in body bore 34, rapidly and with precision, as with respects to port and passage positioning.

In the example, the valve housing 10 and cavity 14 are longitudinally elongated, and the three ports are spaced apart in longitudinal sequence, as shown, port sections 12a and 12b communicating with cavity bore 14a; the port 13 communicating with an end 14b of the cavity, and port 11 located in a plug 16 that is received in housing bore 18 and becomes part of the housing. Plug 16 includes a tubular sleeve 16a that forms port 11. Plug 16 also defines a tapered seat 16b, flaring endwise longitudinally toward cavity 14. The housing 10 also forms a tapered seat 10a flaring endwise oppositely, and longitudinally toward cavity 14.

Figure 1A:
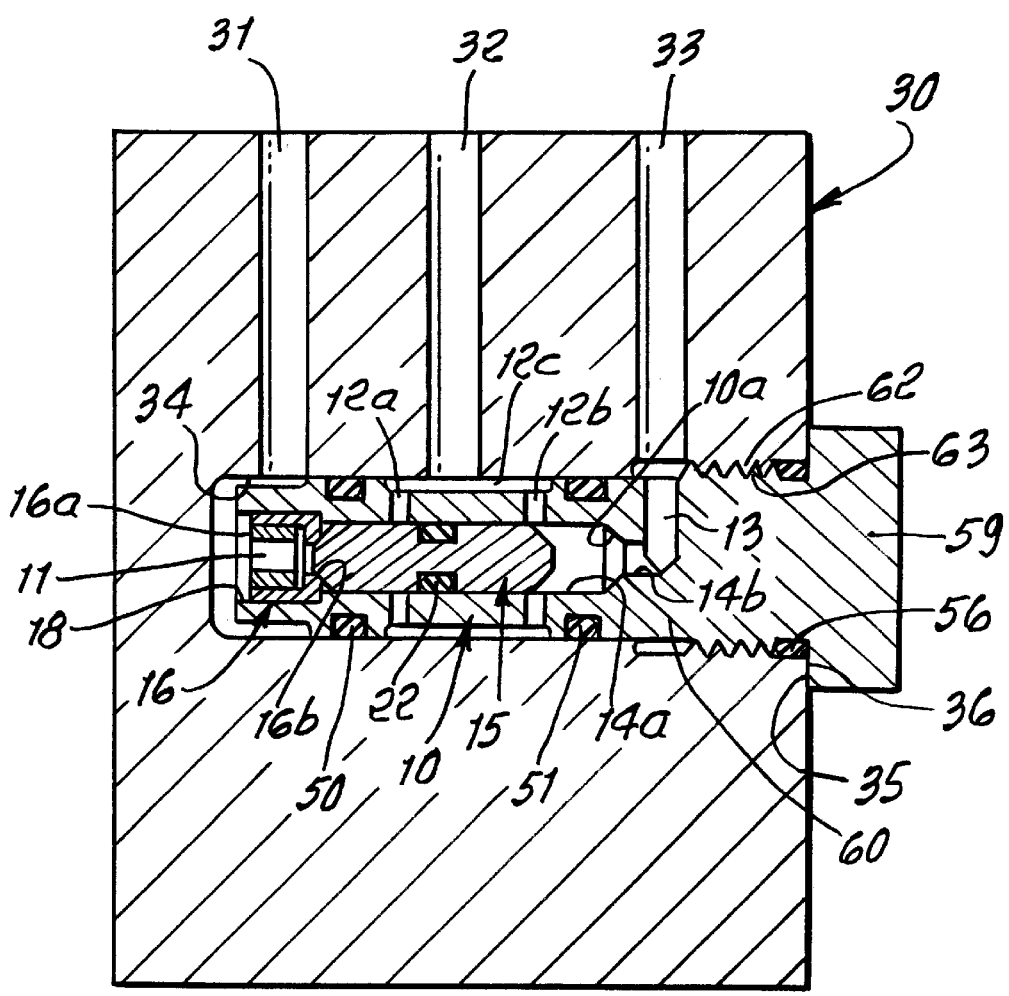
FIG. 1a is a view like FIG. 1, but showing the poppet in a leftward position.
Figure 2:
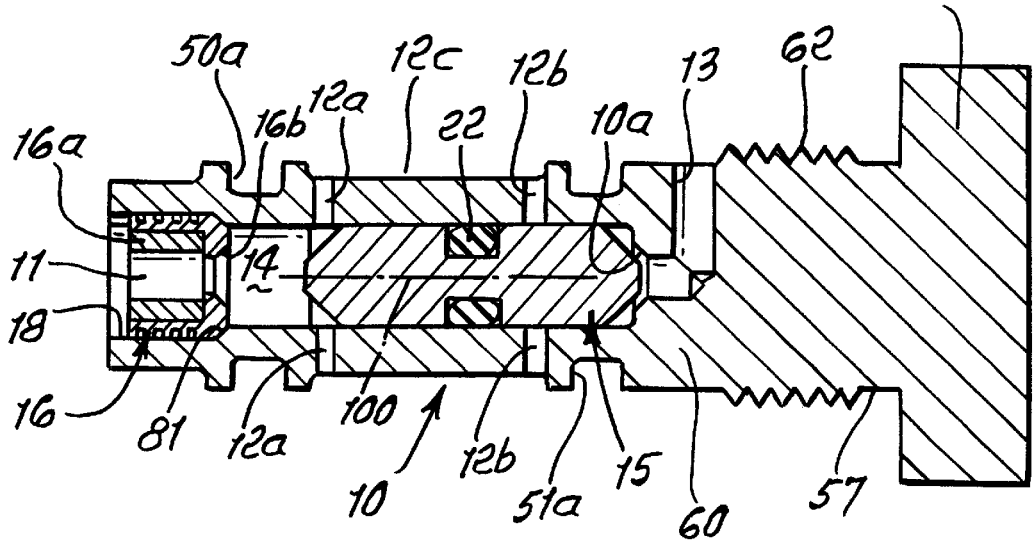
FIG. 2 is an enlarged section showing the poppet valve housing and poppet also shown in FIG. 1.

It will be noted that the longitudinal spacing of the second port sections 12a and 12b exceeds the axial shifting displacement distance of the poppet between its first position (FIG. 1) and its second position (FIG. 1a). Also axial shifting of the poppet to FIG. 1 position, exposes port section 12a to the end of cavity 14 proximate port 11 while port section 12b is blanked by the poppet body at 15a; and axial shifting of the poppet to FIG. 1a position, exposes port section 12b to the opposite end of the cavity 14, proximate port 13, while the section 12a is blanked by the poppet body at 15b. The tapered noses 15c and 15d of the poppet extend adjacent one or the other of the port sections 11 and 13, to direct flow angularly between the cavity and the radially extending second port sections. Multiple of the sections 12a and 12b may be provided to be spaced about axis 100, as shown. See FIG. 2.

It is a feature of the invention that a friction responsive holder is provided, acting to hold the poppet in its first position until fluid pressure shifts the poppet to second position, and to hold the poppet in said second position until fluid pressure shifts the poppet endwise oppositely to its first position.

Figure 3:
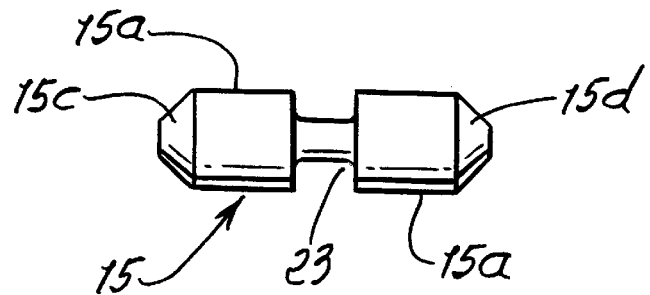
FIG. 3 is a side elevation showing the poppet or shuttle received in the housing seen in FIG. 2.

In this regard, the holder advantageously may take the form of an O-ring 22 carried by the poppet in a position, intermediate the radially inner ends of the second port sections 12a and 12b, to frictionally engage a surface (for example bore 14a) to resist poppet shifting, until fluid pressure creates force exerted endwise on the poppet that overcomes the frictional engagement of the O-ring and surface 14a. The positioning is such that the O-ring, which may consist of elastomeric material, never transverses the inner ends of 12a and 12b, so that port sharp edge engagement with the O-ring is avoided along with damage to the O-ring that might otherwise occur. The O-ring is confined within an annular recess 23 sunk in the poppet circular periphery, to a depth and width assuring O-ring frictional engagement with bore 14a, at all times. See FIG. 3. Poppet cylindrical lands 15a engage bore 14a.

Also provided, as shown in FIG. 1 is a body 30 having a longitudinally extending bore 34 into which housing 10 is endwise received, shoulder 35 on the housing engaging stop shoulder 36 on the body to limit such endwise reception. The body 30 has first, second and third passages 31, 32 and 33 brought into registration with housing ports 11, 12 and 13, at locations 31a, 32a and 33a as shown in FIG. 1. Such passages enable operation, as follows: a main pressure source $P_1$ is initially in communication with passage 31, and port 11, as in FIG. 1, whereby the pressure drives the poppet to the right to seat at 10a. Fluid pressure then flows via port 11, cavity 14, and port sections 12a and 12c to then flow via passage 32 to an actuator A. If pressure source $P_1$ fails, an auxiliary pressure source $P_2$ is brought into communication with passage 33 and port 13. Such auxiliary pressure drives the poppet to the left, i.e. into FIG. 1a position, causing the poppet to seat at 16b. Fluid pressure from $P_2$ then flows via port 13, cavity 14, and port sections 12b and 12c to flow via passage 32 to the actuator A. The actuator may for example take the form of an aircraft landing gear lowering and raising actuator, or an aircraft door opening and closing actuator, or a wing flap actuator.

Figure 4:
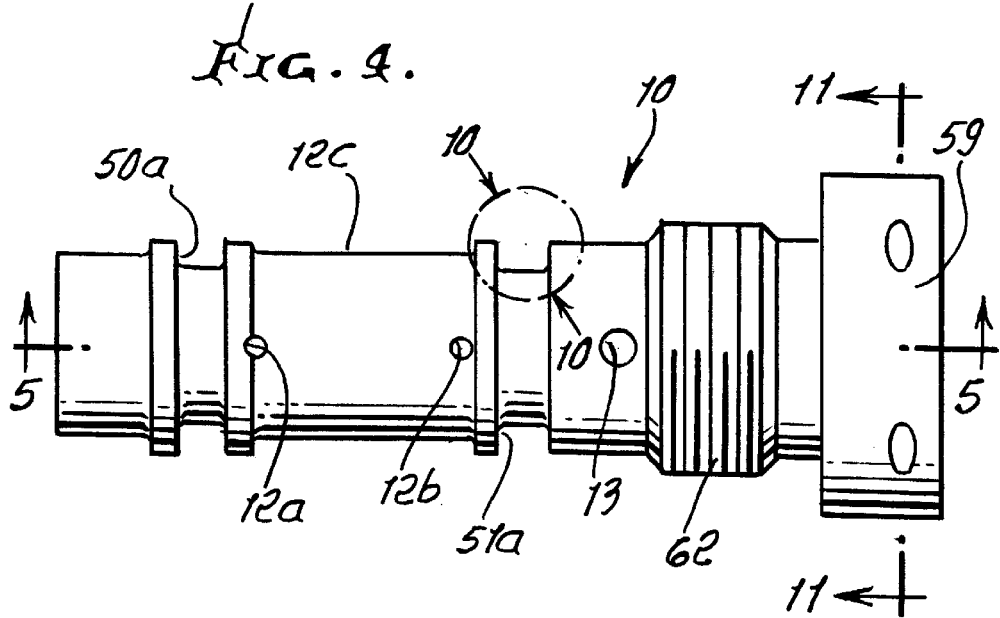
FIG. 4 is a side elevation showing the exterior of the poppet valve housing.

Sealing O-rings 50 and 51 are installed in annular grooves 50a and 51a sunk in the housing 10, at opposite sides of the port sections 12a and 12b, (see FIG. 4) for sealing off against the body bore 34. Ports 11 and 13 are thereby sealed off at 34 from intermediate port 12 and its sections 12a and 12b. In addition, sealing O-ring 56 seals off between annular surface 57 of the housing and counter bore 58 formed in the body 30. A head 59 on the housing shank 60, abuts the side 36b of body 30, to limit insertion of the housing 10 into bore 34, in the position shown. Threads may be provided at 62 and 63 for retention of the shank 60 in the body 30.

Figure 5:
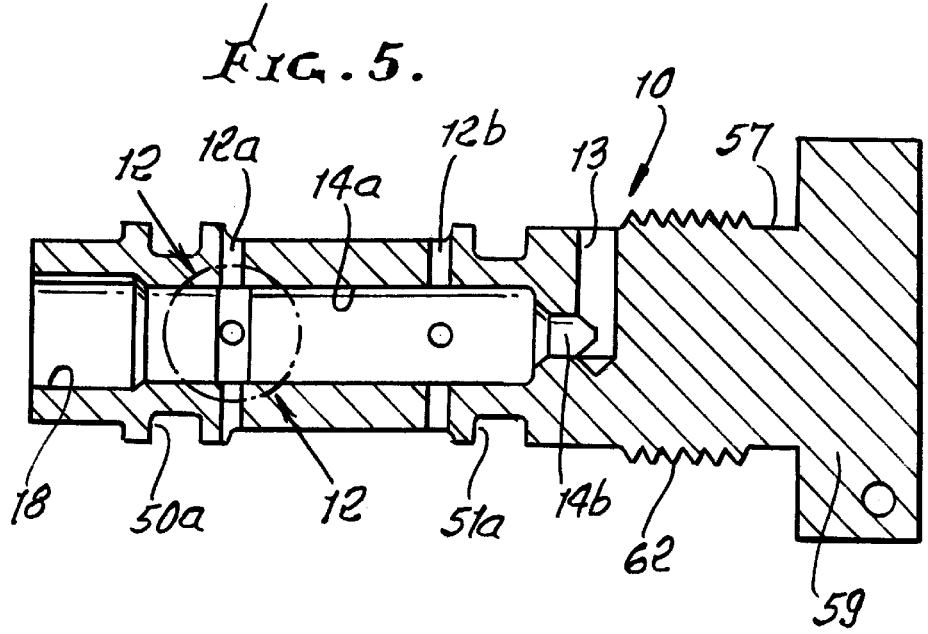
FIG. 5 is a section taken on lines 5—5 of FIG. 4.
Figure 7:
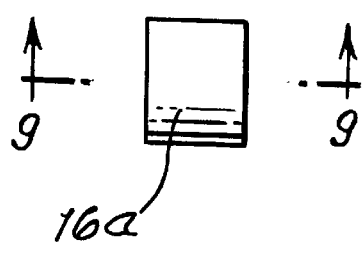
FIG. 7 is a side elevation showing a tubular sleeve.
Figure 6:
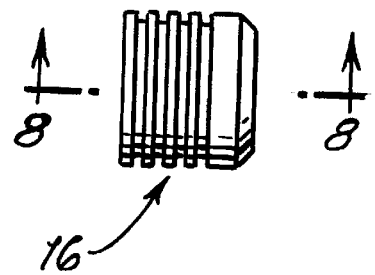
FIG. 6 is a side elevation showing a poppet valve retainer and seat, receivable by the poppet valve housing.
Figure 9:
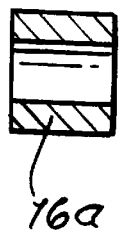
FIG. 9 is a section taken on lines 9–9 of FIG. 7.
Figure 8:
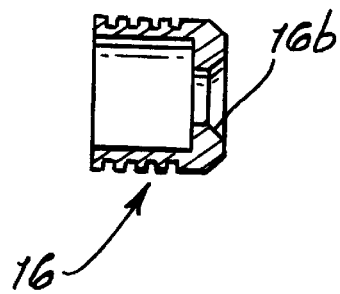
FIG. 8 is a section taken on lines 8–8 of FIG. 6.

FIGS. 5 and 12 show provision of an arcuate recess 70 sunk in the bore 14a and radially intersecting port section or sections 12a. That recess has width greater than the diameter of each of the radial ports 12a, to enhance flow access to those ports, facilitating uninterrupted flow. Note the smooth radii at edges 70a and 70b of that recess, in FIG. 12. See also angled wall 73 of the groove 51a in FIG. 10, and the fillet at 74 at the base of wall 73, in FIG. 10. A similar arcuate recess 70' intersects port section or sections 12b.

Since the assembly incorporates only a few parts, i.e. typically less than ten, the shuttle shank may be simply and easily installed in bore 14a, plug 16 may be inserted in counter bore 80 to seat at 81, and the housing 10 may be installed endwise in body bore 34, rapidly and with precision, as with respects to port and passage positioning.

I claim:

1. A shuttle valve assembly, comprising
  a) a valve housing containing first, second and third ports, and a cavity in the housing,
  b) a poppet shiftable in the cavity between a first position and a second position,
  c) the poppet in its first position directing flow between the first port and the second port, communication between the second port and third port then being blocked,
  d) the poppet in its second position directing flow between the third port and the second port, communication between the second port and first port then being blocked,
  e) and a friction responsive holder acting to hold the poppet in said first position until fluid pressure shifts the poppet to said second position, and to hold the poppet in said second position until fluid pressure shifts the poppet to said first position,
  f) there being a body having a bore into which said housing is endwise received, the body having first, second and third passages in registration with said first, second and third ports, respectfully,
  g) said first, second and third passages intersecting said bore transversely of the poppet.

2. The shuttle valve of claim 1 including O-rings sealing off between said housing and body at said bore, to prevent fluid leakage between said first, second and third ports.

3. The shuttle valve assembly of claim 1 wherein said second port has two sections which are longitudinally spaced apart and which intersect a bore defined by the housing at intersection locations, said friction responsive holder remaining between said intersection locations at all times during shifting of the poppet between its first and second positions, and the second port having an additional section which is longitudinally elongated, radially outwardly of the holder, and which intersects radially outward extents of said two sections of the second port.

4. The shuttle valve assembly of claim 3 comprising less than ten parts, in toto.

5. A shuttle valve assembly, comprising
  a) a valve housing containing first, second and third ports, and a cavity in the housing, b) a poppet shiftable in the cavity between a first position and a second position, c) the poppet in its first position directing flow between the first port and the second port, communication between the second port and third port then being blocked, d) the poppet in its second position directing flow between the third port and the second port, communication between the second port and first port then being blocked, e) and a friction responsive holder acting to hold the poppet in said first position until fluid pressure shifts the poppet to said second position, and to hold the poppet in said second position until fluid pressure shifts the poppet to said first position, f) said holder being carried by the poppet in a position to frictionally engage a surface to resist poppet shifting, until fluid pressure creates force that overcomes the frictional engagement of the holder and surface.

6. The shuttle valve assembly of claim 5, wherein the holder is an O-ring that extends about an axis defined by the poppet, that axis extending in the direction of poppet shifting.

7. The shuttle valve assembly of claim 6 wherein said O-ring is elastomeric.

8. The shuttle valve assembly of claim 6 wherein the O-ring is carried out of the direct flow paths of pressurized fluid in each of said first and second poppet positions.

9. The shuttle valve assembly of claim 8 wherein the poppet has spaced piston surfaces for receiving fluid pressure acting to shift the poppet between said positions, said O-ring located between said piston surfaces.

10. A shuttle valve assembly, comprising a) a valve housing containing first, second and third ports, and a cavity in the housing, b) a poppet shiftable in the cavity between a first position and a second position, c) the poppet in its first position directing flow between the first port and the second port, communication between the second port and third port then being blocked, d) the poppet in its second position directing flow between the third port and the second port, communication between the second port and first port then being blocked, e) and a friction responsive holder acting to hold the poppet in said first position until fluid pressure shifts the poppet to said second position, and to hold the poppet in said second position until fluid pressure shifts the poppet to said first position, f) and wherein the poppet has longitudinally spaced tapered ends, and there are recessed tapered seats on the housing and on a plug received in the housing, to seat said tapered ends, alternately.

* * * * *